US008148471B2

(12) United States Patent
Kavanagh et al.

(10) Patent No.: US 8,148,471 B2
(45) Date of Patent: Apr. 3, 2012

(54) ACRYLIC PRESSURE-SENSITIVE ADHESIVES WITH AZIRIDINYL-EPOXY CROSSLINKING SYSTEM

(75) Inventors: Maureen A. Kavanagh, Stanchfield, MN (US); Larry R. Krepski, White Bear Lake, MN (US); Kelly S. Anderson, Houlton, WI (US); Peiwang Zhu, Woodbury, MN (US); Belma Erdogan-Haug, St. Paul, MN (US); Babu N. Gaddam, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 12/939,205

(22) Filed: Nov. 4, 2010

(65) Prior Publication Data
US 2011/0124797 A1 May 26, 2011

Related U.S. Application Data

(60) Provisional application No. 61/263,422, filed on Nov. 23, 2009.

(51) Int. Cl.
*C08L 33/02* (2006.01)
*C08L 33/04* (2006.01)
*C08L 35/02* (2006.01)
*C08L 39/00* (2006.01)
*C08F 8/00* (2006.01)
(52) U.S. Cl. ......... 525/193; 525/217; 525/221; 525/222
(58) Field of Classification Search .................. 525/193, 525/217, 221, 222
See application file for complete search history.

(56) References Cited

U.S. PATENT DOCUMENTS

| RE24,906 | E | 12/1960 | Ulrich |
|---|---|---|---|
| 3,243,429 | A | 3/1966 | Ham |
| 3,337,533 | A | 8/1967 | Ham |
| 3,511,897 | A | 5/1970 | Endsley |
| 3,691,140 | A | 9/1972 | Silver |
| 4,026,880 | A | 5/1977 | Mitchell |
| 4,062,886 | A | 12/1977 | Turner |
| 4,166,152 | A | 8/1979 | Baker et al. |
| 4,181,755 | A | 1/1980 | Liu et al. |
| 4,225,665 | A | 9/1980 | Schadt, III |
| 4,243,500 | A | 1/1981 | Glennon |
| 4,303,485 | A | 12/1981 | Levens |
| 4,304,705 | A | 12/1981 | Heilmann et al. |
| 4,364,972 | A | 12/1982 | Moon |
| 4,605,698 | A | 8/1986 | Briden |
| 4,619,979 | A | 10/1986 | Kotnour et al. |
| 4,636,432 | A | 1/1987 | Shibano et al. |
| 4,656,218 | A | 4/1987 | Kinoshita |
| 4,777,276 | A | 10/1988 | Rasmussen et al. |
| 4,843,134 | A | 6/1989 | Kotnour et al. |
| 5,045,569 | A | 9/1991 | Delgado |
| 5,289,745 | A | 3/1994 | Beardsley |
| 5,506,279 | A | 4/1996 | Babu et al. |
| 5,532,112 | A | 7/1996 | Kohler et al. |
| 5,534,391 | A | 7/1996 | Wang |
| 5,741,543 | A | 4/1998 | Winslow et al. |
| 5,753,768 | A | 5/1998 | Ellis |
| 5,773,485 | A | 6/1998 | Bennett et al. |
| 5,902,836 | A | 5/1999 | Bennett et al. |
| 6,245,922 | B1 | 6/2001 | Heilmann et al. |
| 6,294,249 | B1 | 9/2001 | Hamer et al. |
| 6,349,446 | B1 | 2/2002 | Krause et al. |
| 6,521,682 | B1 | 2/2003 | Costantino et al. |
| 6,734,256 | B1 | 5/2004 | Everaerts et al. |
| 6,879,718 | B2 | 4/2005 | Hullender |
| 6,893,719 | B1 | 5/2005 | Nakajima et al. |
| 7,276,247 | B2 | 10/2007 | Fansler et al. |
| 7,339,002 | B2 | 3/2008 | Guo et al. |
| 7,385,020 | B2 | 6/2008 | Anderson et al. |
| 7,393,901 | B1 | 7/2008 | Filiatrault et al. |
| 7,459,489 | B2 | 12/2008 | Lewandowski et al. |
| 7,612,122 | B2 | 11/2009 | Herlihy et al. |
| 7,652,095 | B2 | 1/2010 | Filiatrault et al. |
| 7,652,103 | B2 | 1/2010 | Kavanagh et al. |
| 7,691,915 | B2 | 4/2010 | Kim et al. |
| 7,714,076 | B2 * | 5/2010 | Krepski et al. ............. 525/329.9 |
| 7,838,110 | B2 | 11/2010 | Zhu et al. |
| 2003/0215630 | A1 | 11/2003 | Melancon et al. |
| 2004/0116598 | A1 | 6/2004 | Guo et al. |
| 2007/0213463 | A1 | 9/2007 | Sherman et al. |
| 2007/0299211 | A1 | 12/2007 | Chen et al. |
| 2008/0319122 | A1 | 12/2008 | Filiatrault et al. |
| 2009/0208740 | A1 | 8/2009 | Kavanagh et al. |
| 2009/0246390 | A1 | 10/2009 | Krepski et al. |
| 2010/0081759 | A1 | 4/2010 | Kavanagh et al. |
| 2010/0227969 | A1 | 9/2010 | Zhu et al. |

FOREIGN PATENT DOCUMENTS

DE 2630784 2/1977
(Continued)

OTHER PUBLICATIONS

PCT International Search Report, PCT/US2010/057138. U.S. Appl. No. 12/547,008, entitled "Acrylic Pressure-sensitive Adhesives with Acylaziridine Crosslinking Agents," filed Aug. 25, 2009.
Pocius, "Adhesion and Adhesives Technology, An Introduction", (2002), 2nd Edition, Hanser Gardner Publications, Inc., Cincinnati, OH.
PSTC-7, "Holding Power of Pressure Sensitive Tape", Revised (1989), pp. 37-39.
ASTM D 3330/D 3330M-04, "Standard Test Method for Peel Adhesion of Pressure-Sensitive Tape", (2004), pp. 1-6, ASTM Int'l.
ASTM D 3654/D 3654M-06, "Standard Test Methods for Shear Adhesion of Pressure-Sensitive Tapes", (2006), pp. 1-6, ASTM Int'l.
Rosenthal et al., "The Synthesis of β-Amino Mercaptans and β-Amino Thiosulfates via Ethylenimine Intermediates", Journal of Organic Chemistry, vol. 30, Issue 11, Nov. 1965, pp. 3689-3696.
McCormick et al., "Water-Soluble Polymers," Encyclopedia of Polymer Science and Technology, pp. 452-521, Jul. 2004.

(Continued)

*Primary Examiner* — Nathan M Nutter
(74) *Attorney, Agent, or Firm* — Kent S. Kokko

(57) ABSTRACT

A pre-adhesive composition is described comprising an acid-functional (meth)acrylate copolymer and a crosslinking system comprising an aziridine crosslinking agent and epoxy-functional (meth)acryloyl monomer, which when crosslinked, provides a pressure-sensitive adhesive and pressure-sensitive adhesive articles.

18 Claims, No Drawings

FOREIGN PATENT DOCUMENTS

| | | |
|---|---|---|
| DE | 4447615 | 7/1996 |
| EP | 0 530 729 | 3/1993 |
| EP | 1 179 577 | 2/2002 |
| JP | 58026869 | 2/1983 |
| JP | 01075577 | 3/1989 |
| JP | 02070780 | 3/1990 |
| JP | 02178379 | 7/1990 |
| JP | 03281586 | 12/1991 |
| JP | 04161477 | 6/1992 |
| JP | 04372682 | 12/1992 |
| JP | 07011211 | 1/1995 |
| JP | 07138542 | 5/1995 |
| JP | 07138544 | 5/1995 |
| WO | WO 79/01013 | 11/1979 |
| WO | WO 95/10552 | 4/1995 |
| WO | WO 97/05100 | 2/1997 |
| WO | WO 02/26448 | 4/2002 |
| WO | WO 02/38694 | 5/2002 |
| WO | WO 2004/029171 | 4/2004 |
| WO | WO 2005/092403 | 10/2005 |
| WO | WO 2008/046000 | 4/2008 |
| WO | WO 2008/100713 | 8/2008 |
| WO | WO 2008/100755 | 8/2008 |
| WO | WO 2009/006254 | 1/2009 |
| WO | WO 2009/102623 | 8/2009 |
| WO | WO 2009/120420 | 10/2009 |
| WO | WO 2009/152126 | 12/2009 |
| WO | WO 2010/132626 | 11/2010 |
| WO | WO 2011/032074 | 3/2011 |

OTHER PUBLICATIONS

Iwakura et al., "A Novel Preparation of Pseudoxzaolones," Tetraheron, vol. 23, pp. 3363-3373, Pergamon Press Ltd., (1967).

Hubner et al., Makromolekulare Chem., vol. 11, No. 124, pp. 109-124, (1970).

Taylor et al., Journal of Polymer Science, Polymer Letters, "The Synthesis of Vinyl Peptide Monomers," vol. 7, pp. 597-603, (1969).

Kulkari et al., "Effect of Asymmetric Centers on Free Radical Polymerization and the Properties of Polymers: Methacrylyl Alanine, Methacrylyl Glutamic Acid, Acrylyl Glutamic Acid, and Their Polymers," Journal of Polymer Science, vol. 54, pp. 491-503, (1961).

Czech, Zbigniew, "New generation of crosslinking agents based on multifunctional methylaziridines," International Journal of Adhesion & Adhesives, vol. 27, (2007), pp. 49-58.

* cited by examiner

ACRYLIC PRESSURE-SENSITIVE ADHESIVES WITH AZIRIDINYL-EPOXY CROSSLINKING SYSTEM

CROSS REFERENCE TO RELATED APPLICATION

This application claims the benefit of U.S. Provisional Patent Application No. 61/263,422, filed Nov. 23, 2009, the disclosure of which is incorporated by reference herein in its entirety.

TECHNICAL FIELD OF THE INVENTION

This invention relates to pressure sensitive adhesives and tape articles prepared therefrom. The tapes are characterized by exhibiting an overall balance of adhesive and cohesive characteristics and exceptional load bearing capabilities.

BACKGROUND OF THE INVENTION

Pressure sensitive tapes are virtually ubiquitous in the home and workplace. In its simplest configuration, a pressure sensitive tape comprises an adhesive and a backing, and the overall construction is tacky at the use temperature and adheres to a variety of substrates using only moderate pressure to form the bond. In this fashion, pressure sensitive tapes constitute a complete, self-contained bonding system.

According to the Pressure-Sensitive Tape Council, pressure-sensitive adhesives (PSAs) are known to possess properties including the following: (1) aggressive and permanent tack, (2) adherence with no more than finger pressure, (3) sufficient ability to hold onto an adherend, and (4) sufficient cohesive strength to be removed cleanly from the adherend. Materials that have been found to function well as PSAs include polymers designed and formulated to exhibit the requisite viscoelastic properties resulting in a desired balance of tack, peel adhesion, and shear holding power. PSAs are characterized by being normally tacky at room temperature (e.g., 20° C.). PSAs do not embrace compositions merely because they are sticky or adhere to a surface.

These requirements are assessed generally by means of tests which are designed to individually measure tack, adhesion (peel strength), and cohesion (shear holding power), as noted in A. V. Pocius in Adhesion and Adhesives Technology: An Introduction, $2^{nd}$ Ed., Hanser Gardner Publication, Cincinnati, Ohio, 2002. These measurements taken together constitute the balance of properties often used to characterize a PSA.

With broadened use of pressure sensitive tapes over the years, performance requirements have become more demanding. Shear holding capability, for example, which originally was intended for applications supporting modest loads at room temperature, has now increased substantially for many applications in terms of operating temperature and load. So-called high performance pressure sensitive tapes are those capable of supporting loads at elevated temperatures for 10,000 minutes. Increased shear holding capability has generally been accomplished by crosslinking the PSA, although considerable care must be exercised so that high levels of tack and adhesion are retained in order to retain the aforementioned balance of properties.

There are two major crosslinking mechanisms for acrylic adhesives: free-radical copolymerization of multifunctional ethylenically unsaturated groups with the other monomers, and covalent or ionic crosslinking through the functional monomers, such as acrylic acid. Another method is the use of UV crosslinkers, such as copolymerizable benzophenones or post-added photocrosslinkers, such as multifunctional benzophenones and triazines. In the past, a variety of different materials have been used as crosslinking agents, e.g., polyfunctional acrylates, acetophenones, benzophenones, and triazines. The foregoing crosslinking agents, however, possess certain drawbacks which include one or more of the following: high volatility; incompatibility with certain polymer systems; generation of corrosive or toxic by-products; generation of undesirable color; requirement of a separate photoactive compound to initiate the crosslinking reaction; and high sensitivity to oxygen.

SUMMARY

Briefly, the present disclosure provides a pre-adhesive composition comprising an acid-functional (meth)acrylate copolymer and a crosslinking system comprising a) an aziridine crosslinking agent and b) an epoxy-functional (meth) acryloyl monomer, which when crosslinked, provides a pressure sensitive adhesive composition.

The use of the novel crosslinking system affords a number of advantages as compared to the use of conventional crosslinking agents for (meth)acrylic adhesives. These advantages include, but are not limited to, decreased sensitivity of the crosslinkable composition to oxygen; the avoidance of evolution of any toxic or corrosive by-products or discoloration of the final product; and the capability to be used as a post-curing crosslinking additive. Furthermore, the crosslinking system, comprising an aziridine crosslinking agent and an epoxy-functional (meth)acryloyl monomer, have the following advantages over previously described agents: ease of synthesis, high solubility in the component monomers or organic solvents, and low cost starting materials. In addition, the cured adhesives exhibit high peel strength, and high cohesive strength, and high temperature shear strength.

In one aspect, the disclosure provides a novel pre-adhesive syrup polymer composition comprising a) an acid-functional (meth)acrylate solute copolymer, b) at least one free-radically polymerizable solvent monomer, c) an aziridine crosslinking agent and d) an epoxy-functional (meth)acryloyl monomer. The pre-adhesive syrup polymer composition may be polymerized and crosslinked to produce a pressure-sensitive adhesive.

In another embodiment the disclosure provides a pre-adhesive emulsion comprising an aqueous emulsion of the acid-functional (meth)acrylate copolymer, an aziridine crosslinking agent and an epoxy-functional (meth)acryloyl monomer, which may be coated and crosslinked to form a pressure sensitive adhesive. In a related embodiment, the present disclosure provides an adhesive emulsion comprising an aqueous emulsion of the reaction product of the acid-functional (meth)acrylate copolymer, the an aziridine crosslinking agent and an epoxy-functional (meth)acryloyl monomer, which may be coated and cured to form a pressure sensitive adhesive.

For environmental reasons, there is a desire to move away from the use of volatile organic solvents (VOC's) in coating processes, and towards more environmentally friendly water-based materials, so the present invention provides a waterborne adhesive comprising an aqueous emulsion supra. Waterborne systems are desirable for cost, environmental, safety, and regulatory reasons. The aqueous system may be readily coated, and provides a pressure-sensitive adhesive when cured.

The pressure-sensitive adhesives, the crosslinked compositions, of this disclosure provide the desired balance of tack, peel adhesion, and shear holding power, and further conform to the Dahlquist criteria; i.e. the modulus of the adhesive at the application temperature, typically room temperature, is less than $3 \times 10^6$ dynes/cm at a frequency of 1 Hz.

In some embodiments, this disclosure provides an adhesive composition derived from renewable resources. In particular, the present invention provides an adhesive composition derived, in part, from plant materials. In some embodiments, the present invention further provides an adhesive article, wherein the substrate or backing is also derived from renewable resources. The increase in the price of oil, and concomitant petroleum-derived products, has led to volatile prices and supply for many adhesive products. It is desirable to replace all or part of the petroleum-based feedstocks with those derived from renewable sources, such as plants, as such materials become relatively cheaper, and are therefore both economically and socially beneficial. Therefore, the need for such plant-derived materials has become increasingly significant.

In this application "pre-adhesive" refers to the solution, suspension, or emulsion comprising an acid-functional (meth)acrylate copolymer, and crosslinking system comprising an aziridine crosslinking agent and which may be crosslinked to form a pressure sensitive adhesive.

"Syrup polymer" refers to a solution of a solute polymer in one or more solvent monomers, the solution having a viscosity of from 500 to 10,000 cPs at 22° C. "Solution polymer" refers to a solution of a solute polymer in one or more organic solvents.

As used herein "(meth)acryloyl" is inclusive of (meth)acrylate and (meth)acrylamide.

In this application, (meth)acrylic is inclusive of both methacrylic and acrylic.

As used herein, "alkyl" includes straight-chained, branched, and cyclic alkyl groups and includes both unsubstituted and substituted alkyl groups. Unless otherwise indicated, the alkyl groups typically contain from 1 to 20 carbon atoms. Examples of "alkyl" as used herein include, but are not limited to, methyl, ethyl, n-propyl, n-butyl, n-pentyl, isobutyl, t-butyl, isopropyl, n-octyl, n-heptyl, ethylhexyl, cyclopentyl, cyclohexyl, cycloheptyl, adamantyl, and norbornyl, and the like. Unless otherwise noted, alkyl groups may be mono- or polyvalent.

As used herein, the term "heteroalkyl" includes both straight-chained, branched, and cyclic alkyl groups with one or more heteroatoms independently selected from S, O, and N with both unsubstituted and substituted alkyl groups. Unless otherwise indicated, the heteroalkyl groups typically contain from 1 to 20 carbon atoms. "Heteroalkyl" is a subset of "hydrocarbyl containing one or more S, N, O, P, or Si atoms" described below. Examples of "heteroalkyl" as used herein include, but are not limited to, methoxy, ethoxy, propoxy, 3,6-dioxaheptyl, 3-(trimethylsilyl)-propyl, 4-dimethylaminobutyl, and the like. Unless otherwise noted, heteroalkyl groups may be mono- or polyvalent.

As used herein, "aryl" is an aromatic group containing 6-18 ring atoms and can contain optional fused rings, which may be saturated, unsaturated, or aromatic. Examples of an aryl groups include phenyl, naphthyl, biphenyl, phenanthryl, and anthracyl. Heteroaryl is aryl containing 1-3 heteroatoms such as nitrogen, oxygen, or sulfur and can contain fused rings. Some examples of heteroaryl groups are pyridyl, furanyl, pyrrolyl, thienyl, thiazolyl, oxazolyl, imidazolyl, indolyl, benzofuranyl, and benzthiazolyl. Unless otherwise noted, aryl and heteroaryl groups may be mono- or polyvalent.

As used herein, "(hetero)hydrocarbyl" is inclusive of hydrocarbyl alkyl and aryl groups, and heterohydrocarbyl heteroalkyl and heteroaryl groups, the later comprising one or more catenary (in-chain) heteroatoms such as ether or amino groups. Heterohydrocarbyl may optionally contain one or more catenary (in-chain) functional groups including ester, amide, urea, urethane, and carbonate functional groups. Unless otherwise indicated, the non-polymeric (hetero)hydrocarbyl groups typically contain from 1 to 60 carbon atoms. Some examples of such heterohydrocarbyls as used herein include, but are not limited to, methoxy, ethoxy, propoxy, 4-diphenylaminobutyl, 2-(2'-phenoxyethoxy)ethyl, 3,6-dioxaheptyl, 3,6-dioxahexyl-6-phenyl, in addition to those described for "alkyl", "heteroalkyl", "aryl", and "heteroaryl" supra.

DETAILED DESCRIPTION

The present disclosure provides a pre-adhesive composition comprising an acid-functional (meth)acrylate copolymer and a crosslinking system comprising an aziridine crosslinking agent and epoxy-functional (meth)acryloyl monomer, which when crosslinked, provides a pressure-sensitive adhesive and pressure-sensitive adhesive articles.

The (meth)acrylate ester monomer useful in preparing the acid functional (meth)acrylate adhesive copolymer is a monomeric (meth)acrylic ester of a non-tertiary alcohol, which alcohol contains from 1 to 14 carbon atoms and preferably an average of from 4 to 12 carbon atoms.

Examples of monomers suitable for use as the (meth)acrylate ester monomer include the esters of either acrylic acid or methacrylic acid with non-tertiary alcohols such as ethanol, 1-propanol, 2-propanol, 1-butanol, 2-butanol, 1-pentanol, 2-pentanol, 3-pentanol, 2-methyl-1-butanol, 3-methyl-1-butanol, 1-hexanol, 2-hexanol, 2-methyl-1-pentanol, 3-methyl-1-pentanol, 2-ethyl-1-butanol, 3,5,5-trimethyl-1-hexanol, 3-heptanol, 1-octanol, 2-octanol, isooctylalcohol, 2-ethyl-1-hexanol, 1-decanol, 2-propylheptanol, 1-dodecanol, 1-tridecanol, 1-tetradecanol, citronellol, dihydrocitronellol, and the like. In some embodiments, the preferred (meth)acrylate ester monomer is the ester of (meth)acrylic acid with butyl alcohol or isooctyl alcohol, or a combination thereof, although combinations of two or more different (meth)acrylate ester monomer are suitable. In some embodiments, the preferred (meth) acrylate ester monomer is the ester of (meth)acrylic acid with an alcohol derived from a renewable sources, such as 2-octanol, citronellol, dihydrocitronellol.

In some embodiments it is desirable for the (meth)acrylic acid ester monomer to include a high $T_g$ monomer, have a $T_g$ of at least 25° C., and preferably at least 50° C. Suitable high $T_g$ monomers include Examples of suitable monomers useful in the present invention include, but are not limited to, t-butyl acrylate, methyl methacrylate, ethyl methacrylate, isopropyl methacrylate, n-butyl methacrylate, isobutyl methacrylate, s-butyl methacrylate, t-butyl methacrylate, stearyl methacrylate, phenyl methacrylate, cyclohexyl methacrylate, isobornyl acrylate, isobornyl methacrylate, benzyl methacrylate, 3,3,5 trimethylcyclohexyl acrylate, cyclohexyl acrylate, N-octyl acrylamide, and propyl methacrylate or combinations.

The (meth)acrylate ester monomer is present in an amount of 85 to 99.5 parts by weight based on 100 parts total monomer content used to prepare the polymer. Preferably (meth) acrylate ester monomer is present in an amount of 90 to 95 parts by weight based on 100 parts total monomer content. When high $T_g$ monomers are included, the copolymer may include up to 30 parts by weight, preferably up to 20 parts by weight of the 85 to 99.5 parts by weight of (meth)acrylate ester monomer component. In such embodiments, the copolymer may comprise:

i. 55 to 69.5 parts by weight of an (meth)acrylic acid ester of non-tertiary alcohol;
ii. 1 to 30 parts by weight of an (meth)acrylic acid ester having a $T_g$ of greater than 25° C.;
iii. 0.5 to 15 parts by weight of an acid functional ethylenically unsaturated monomer;
iv. 0 to 10 parts by weight of a non-acid functional, ethylenically unsaturated polar monomer;
v. 0 to 5 parts vinyl monomer; and
vi. 0 to 5 parts of a multifunctional (meth)acrylate;
based on 100 parts by weight total monomer.

The polymer further comprises an acid functional monomer, where the acid functional group may be an acid per se, such as a carboxylic acid, or a portion may be salt thereof, such as an alkali metal carboxylate. Useful acid functional monomers include, but are not limited to, those selected from ethylenically unsaturated carboxylic acids, ethylenically unsaturated sulfonic acids, ethylenically unsaturated phosphonic acids, and mixtures thereof. Examples of such compounds include those selected from acrylic acid, methacrylic acid, itaconic acid, fumaric acid, crotonic acid, citraconic acid, maleic acid, oleic acid, β-carboxyethyl (meth)acrylate, 2-sulfoethyl methacrylate, styrene sulfonic acid, 2-acrylamido-2-methylpropanesulfonic acid, vinylphosphonic acid, and mixtures thereof.

Due to their availability, acid functional monomers of the acid functional copolymer are generally selected from ethylenically unsaturated carboxylic acids, i.e. (meth)acrylic acids. When even stronger acids are desired, acidic monomers include the ethylenically unsaturated sulfonic acids and ethylenically unsaturated phosphonic acids. The acid functional monomer is generally used in amounts of 0.5 to 15 parts by weight, preferably 0.5 to 10 parts by weight, based on 100 parts by weight total monomer.

The polar monomers useful in preparing the copolymer are both somewhat oil soluble and water soluble, resulting in a distribution of the polar monomer between the aqueous and oil phases in an emulsion polymerization. As used herein the term "polar monomers" are exclusive of acid functional monomers.

Representative examples of suitable polar monomers include but are not limited to 2-hydroxyethyl (meth)acrylate; N-vinylpyrrolidone; N-vinylcaprolactam; acrylamide; mono- or di-N-alkyl substituted acrylamide; t-butyl acrylamide; dimethylaminoethyl acrylamide; N-octyl acrylamide; poly(alkoxyalkyl) (meth)acrylates including 2-(2-ethoxyethoxy)ethyl (meth)acrylate, 2-ethoxyethyl (meth)acrylate, 2-methoxyethoxyethyl (meth)acrylate, 2-methoxyethyl methacrylate, polyethylene glycol mono(meth)acrylates; alkyl vinyl ethers, including vinyl methyl ether; and mixtures thereof. Preferred polar monomers include those selected from the group consisting of 2-hydroxyethyl (meth)acrylate and N-vinylpyrrolidinone. The polar monomer may be present in amounts of 0 to 10 parts by weight, preferably 0.5 to 5 parts by weight, based on 100 parts by weight total monomer.

When used, vinyl monomers useful in the (meth)acrylate polymer include vinyl esters (e.g., vinyl acetate and vinyl propionate), styrene, substituted styrene (e.g., α-methyl styrene), vinyl halide, and mixtures thereof. As used herein vinyl monomers are exclusive of acid functional monomers, acrylate ester monomers and polar monomers. Such vinyl monomers are generally used at 0 to 5 parts by weight, preferably 1 to 5 parts by weight, based on 100 parts by weight total monomer.

In order to increase cohesive strength of the coated adhesive composition, a multifunctional (meth)acrylate may be incorporated into the blend of polymerizable monomers. Multifunctional acrylates are particularly useful for emulsion or syrup polymerization. Examples of useful multifunctional (meth)acrylate include, but are not limited to, di(meth)acrylates, tri(meth)acrylates, and tetra(meth)acrylates, such as 1,6-hexanediol di(meth)acrylate, poly(ethylene glycol) di(meth)acrylates, polybutadiene di(meth)acrylate, polyurethane di(meth)acrylates, and propoxylated glycerin tri(meth)acrylate, and mixtures thereof. The amount and identity of multifunctional (meth)acrylate is tailored depending upon application of the adhesive composition. Typically, the multifunctional (meth)acrylate is present in amounts less than 5 parts based on total dry weight of adhesive composition. More specifically, the crosslinkers may be present in amounts from 0.01 to 5 parts, preferably 0.05 to 1 parts, based on 100 parts total monomers of the adhesive composition. In some embodiments the crosslinking compositions contains no multifunctional (meth)acrylates.

The adhesive composition further comprises an aziridine crosslinking agent, in addition to the (meth)acrylate copolymer. The aziridine crosslinking agent is generally added in amounts of 0.005 to 5.0 parts by weight of an aziridine crosslinking agent, relative to 100 parts of the copolymer.

The aziridine crosslinking agent is of the general formula:

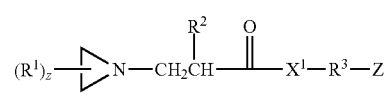

I wherein,
$R^1$ is H or $C_1$-$C_4$ alkyl;
z is 0, 1 or 2
$R^2$ is a H or $C_1$-$C_4$ alkyl;
$R^3$ is a (hetero)hydrocarbyl group:
$X^1$ is —O— or —$NR^1$—;
Z is —H or a water-solubilizing group.

In some embodiments, Z is a hydrogen and $R^3$—Z represents a hydrocarbyl alkyl or aryl group.

In other embodiments, Z is a water-solubilizing group, and pre-adhesive compositions derived therefrom are particularly suited in emulsion adhesive polymer applications. The term "water solubilizing groups" are functional groups that help solubilizing or dispersing the crosslinking agent (and subsequently the adhesive copolymer) in water. By the term "water soluble" is meant that a concentration of at least 0.1% by weight, preferably 0.5% by weight, of the crosslinking agent can be dissolved in water at ambient temperature. By the term "water dispersible" is meant that a dispersion of at least 0.1% by weight of the crosslinking agent in water can be made that is stable for at least 1 hour, preferably for at least 4 hours, without additional emulsifier present.

In some embodiments the aziridine crosslinking agent contains Z; a water solubilizing group, or groups capable of forming water solubilizing groups, so as to obtain a reaction product that is self-emulsifying in water. Suitable water solubilizing groups include cationic, anionic and zwitterionic groups as well as non-ionic water solubilizing groups. Examples of groups capable of forming a water solubilizing group in water include groups that have the potential of being protonated in water such as amino groups, in particular tertiary amino groups.

The water solubilizing group Z may be a cationic, anionic or nonionic water solubilizing group. It will be understood that the ionic nature of any water-solubilizing groups will be affected by the pH of the emulsion, i.e. carboxylic acid groups may be nonionic at low pH and ionic at high pH.

In some embodiments of Formula II, Z may be $Z^1$, where $Z^1$ is an ionic water solubilizing groups selected from ammonium groups, phosphonium groups, sulfonium groups, carboxylates, sulfonates, phosphates, phosphonates or phosphinate groups. Such groups can be represented as —$CO_2M$, —$OSO_3M$, —$SO_3M$, —$OPO_3M$, —$PO(OM)_2$, —$NR_2HX$, —$NR_3X$, —$NRH_2X$, and —$NH_3X$, wherein M is H or one equivalent of a monovalent or divalent soluble cation such as sodium, potassium, calcium, and $NR_3H^+$; X is a soluble anion such as those selected from the group consisting of halide, hydroxide, carboxylate, sulfonates, and the like; and R is selected from the group consisting of a phenyl group, a cycloaliphatic group, or a straight or branched aliphatic group having from about 1 to about 12 carbon atoms. Preferably, R is a lower alkyl group having from 1 to 4 carbon atoms.

Typical examples of a non-ionic water solubilizing group are hydroxyl groups and poly(oxyalkylene) groups. An oxyalkylene unit in the poly(oxyalkylene) group preferably has 2 or 3 carbon atoms, such as —$OCH_2CH_2$—, —$OCH_2CH_2CH_2$—, and —$OCH(CH_3)CH_2$—, the oxyalkylene units in the poly(oxyalkylene) group can be the same, as in poly(oxyethylene), or present as a mixture, as in straight or branched chain or randomly distributed oxyethylene and oxypropylene units or as in a straight or branched chain of blocks of oxyethylene units and blocks of oxypropylene units, as long as the poly(oxyalkylene) group remains water soluble or water dispersible. Particularly preferred poly(oxyalkylene) groups are polyoxyethylene and alkoxypolyoxyethylenes that have a molecular weight up to about 1500. Preferably, the number of oxyalkylene units in a poly(oxyalkylene) is between 2 and 120 and more preferably between 2 and 48. With reference to Formula II, Z is $Z^2$, where $Z^2$ is a poly(oxyalkylene) group.

The aziridine crosslinking agents may be prepared by Michael addition of an aziridine compound with an acryloyl compound, using the general procedure described in U.S. Pat. No. 3,243,429 (Ham), and as illustrated in the following Scheme I:

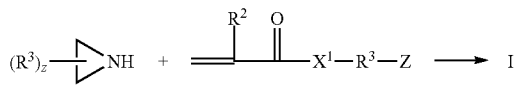

Alternatively, compounds of Formula I may be prepared by Michael addition of an aziridine compound to an acryloyl compound, followed by transesterification or transamidation as illustrated in the following Scheme II:

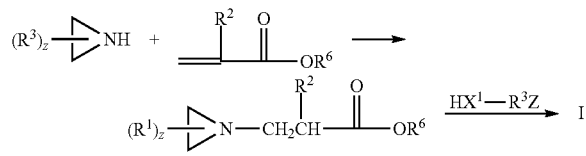

where in Scheme II, "$OR^6$" represents a leaving group, such as an alkoxy group.

The crosslinking system further comprises an epoxy-functional (meth)acryloyl monomer of the formula:

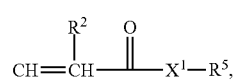

wherein
$R^2$ is —H, or —$CH_3$;
$X^1$ is —$NR^1$— or —O—, wherein $R^1$ is an H or $C_1$-$C_4$ alkyl; and
$R^5$ is an epoxy-containing hydrocarbyl group.

The epoxy-functional (meth)acryloyl monomer can be any suitable monomer as defined above and may be substituted as defined above. Preferably the $R^5$ group is based on a straight-chain, branched, cyclic or polycyclic hydrocarbon of between 2-30 carbons having an oxirane (epoxy) group included. More preferably, the $R^5$ group contains between 3-10 carbons, such as glycidylmethacrylate (GMA). Some embodiments contain an epoxycyclohexyl group such as 3,4-epoxycyclohexylmethyl (meth)acrylate and 3-(2,3-epoxypropoxy) phenyl acrylate, 2-[4-(2,3-epoxypropoxy)phenyl]-2-(4-acryloyloxy-phenyl)propane, 4-(2,3-epoxypropoxy) cyclohexyl acrylate, 2,3-epoxycyclohexyl acrylate, and the acrylic acid monoester of poly(Bisphenol-A diglycidyl ether), commercially available as Ebecryl™ 3605, from Rad-Cure Corp., Fairfield, N.J., and species having $R^5$ according to the formula:
—$[(CH_2)_5C(O)O]_n$—$CH_2$-epoxycyclohexyl, wherein n is 0 to 10 and preferably 1-4. Epoxy-functional (meth)acrylate monomers useful in the invention include the acrylic acid monoester of poly(Bisphenol-A diglycidyl ether), commercially available as Ebecryl™ 3605, from Rad-Cure Corp., Fairfield, N.J., and the polyesters comprising (meth)acrylic acid, caprolactone or valerolactone or cyclooctanone lactone, and epoxidized cyclohexane derivatives such as 3,4-epoxycyclohexylmethanol, 3,4-epoxycyclohexane carboxylic acid, and 4,5-epoxycyclohexane-1,2-dicarboxylic acid.

Some preferred epoxy monomers are of the formula:

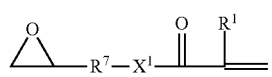

Wherein
$R^7$ is a (hetero)hydrocarbyl group, preferably a hydrocarbyl group;
$R^1$ is —H, or —$CH_3$;
$X^1$ is —$NR^1$— or —O—, wherein $R^1$ is an H or $C_1$-$C_4$ alkyl The epoxy-functional (meth)acryloyl monomer is generally used in amounts of up to a stoichiometric equivalent of the aziridine component. More generally the epoxy-functional (meth)acryloyl monomer is generally used in amounts of in amounts 0.005 to 5.0 parts by weight relative to 100 parts by weight of said first component acid-functional acrylic copolymer.

It is believed that the aziridine group reacts with the pendent acid functional groups of the acid functional (meth) acrylate copolymer to form a carboxyethyleneamino linkage as shown in Scheme III. In one embodiment, the intermediate may be of the following structure, with the optional monomer units and unreacted (free) acid functional monomer units not shown. It is further believed that the secondary nitrogen atom, derived from ring-opening of the aziridine, then adds to the epoxy group of the epoxy-functional (meth)acryloyl monomer. As can be seen, the reaction of the secondary nitrogen atom provides a pendent acryloyl group that may be subsequently crosslinked. It will be understood that the $R^1$ group may be on the indicated carbon, or attached to the carbon adjacent to the ester oxygen atom, depending on the ring opening of the aziridine group.

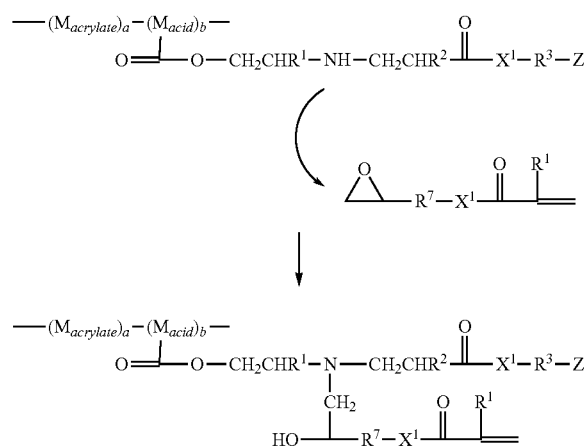

Scheme III

The acid functional copolymers can be prepared by any conventional free radical polymerization method, including solution, radiation, bulk, dispersion, emulsion, and suspension processes. The (meth)acrylate polymers may be prepared via suspension polymerizations as disclosed in U.S. Pat. No. 3,691,140 (Silver); U.S. Pat. No. 4,166,152 (Baker et al.); U.S. Pat. No. 4,636,432 (Shibano et al); U.S. Pat. No. 4,656,218 (Kinoshita); and U.S. Pat. No. 5,045,569 (Delgado). Each describes adhesive compositions, and the descriptions of polymerization processes are incorporated herein by reference.

Water-soluble and oil-soluble initiators useful in preparing the acid functional copolymers are initiators that, on exposure to heat, generate free-radicals which initiate (co)polymerization of the monomer mixture. Water-soluble initiators are preferred for preparing the (meth)acrylate polymers by emulsion polymerization. When used, initiators may comprise from about 0.05 to about 1 part by weight, preferably about 0.1 to about 0.5 part by weight based on 100 parts by weight of monomer components in the acid functional copolymers.

Suitable water-soluble initiators include but are not limited to those selected from the group consisting of potassium persulfate, ammonium persulfate, sodium persulfate, and mixtures thereof; oxidation-reduction initiators such as the reaction product of the above-mentioned persulfates and reducing agents such as those selected from the group consisting of sodium metabisulfite and sodium bisulfite; and 4,4'-azobis(4-cyanopentanoic acid) and its soluble salts (e.g., sodium, potassium). The preferred water-soluble initiator is potassium persulfate. Suitable oil-soluble initiators include but are not limited to those selected from the group consisting of azo compounds such as VAZO™ 64 (2,2'-azobis(isobutyronitrile)), VAZO™ 67 (2,2'azobis (2-methylbutyronitrile)), and VAZO™ 52 (2,2'-azobis(2,4-dimethylpentanenitrile)), available from E.I. du Pont de Nemours Co., peroxides such as benzoyl peroxide and lauroyl peroxide, and mixtures thereof. The preferred oil-soluble thermal initiator is 2,2'-azobis-(2,4-dimethylpentanenitrile).

The copolymerizable emulsion mixture may optionally further comprise chain transfer agents to control the molecular weight of the resultant polymer. Examples of useful chain transfer agents include but are not limited to those selected from the group consisting of carbon tetrabromide, alcohols, mercaptans, and mixtures thereof. When present, the preferred chain transfer agents are isooctylthioglycolate and carbon tetrabromide. The emulsion mixture may further comprise up to about 0.5 parts by weight of a chain transfer agent, typically about 0.01 to about 0.5 parts by weight, if used, preferably about 0.05 parts by weight to about 0.2 parts by weight, based upon 100 parts by weight of the total monomer mixture.

Polymerization of the acid functional copolymers via emulsion techniques may require the presence of an emulsifier (which may also be called an emulsifying agent or a surfactant). Useful emulsifiers for the present invention include those selected from the group consisting of anionic surfactants, cationic surfactants, nonionic surfactants, and mixtures thereof.

Preferably, emulsion polymerization is carried out in the presence of anionic surfactant(s). A useful range of emulsifier concentration is from about 0.5 to about 8 weight percent, preferably from about 1 to about 5 weight percent, based on the total weight of all monomers of the emulsion pressure sensitive adhesive.

The acid functional (meth)acrylate copolymers may be prepared by a batch, continuous or semi-continuous emulsion polymerization process. The polymerization generally comprises the steps of:
(a) making a monomer premix comprising;
 (i) a (meth)acrylic acid ester monomer,
 (ii) an acid functional monomer;
 (iii) optionally a polar monomer,
 (iv) optionally a vinyl monomer,
 (v) optionally a multifunctional (meth)acrylate;
 (vi) optionally a chain transfer agent,
(b) combining said premix with a water phase comprising:
 (i) water,
 (ii) a surfactant selected from the group consisting of anionic surfactants, nonionic surfactants, cationic surfactants, amphoteric surfactants, polymeric surfactants, and mixtures thereof,
 (iii) a free radical initiator, preferable a water soluble initiator,
(c) concurrently agitating and heating said emulsion to a temperature of about 30° C. to about 80° C., and permitting polymerization of said monomers in the oil-in-water emulsion until a polymeric latex is formed. It will be understood that other mixtures may be used. For example, the acid functional monomer, or other hydrophilic monomers, may be added to the aqueous solution. In addition, once the emulsion mixture is prepared, the monomers may partition between the oil phase and the water phase, according to their respective partition coefficients. It will be understood that the monomer premix may also include the aziridine. Alternatively, the aziridine may be added to the extant polymer.

A neutralizing agent may be employed in the preparation of this copolymer. It may be employed at a level sufficient to neutralize all or a part of the acid groups of the polymer. Neutralization is achieved via the use of an alkali metal hydroxide or a combination of an alkali metal hydroxide with a minor amount of another neutralizing agent. A wide variety of other neutralizing agents may be used as will be understood by those skilled in the art. The selection of the other neutralizing agent, and the amount employed may be varied to achieve a desired result. However, the type and amount selected must not render the adhesive non-dispersible. Preferably ammonium, sodium and potassium hydroxide are used as neutralizing agents.

A alternate method of preparing acid functional (meth) acrylate copolymers comprises partially polymerizing monomers to produce a syrup polymer comprising the acid functional (meth)acrylate copolymer and unpolymerized monomers. The syrup polymer composition is polymerized to a useful coating viscosity, which may be coated onto a substrate (such as a tape backing) and further polymerized. Partial polymerization provides a coatable solution of the acid functional (meth)acrylate solute copolymer in one or more solvent monomers. Generally, the crosslinking system—comprising the aziridine and epoxy-functional (meth)acryloyl monomer—is added to the partially polymerized composition, then coated on a suitable substrate and further polymerized.

For syrup application processing, a preferred monomer mixture (second component) comprises 85 to 99.5 pbw of one or more (meth)acrylate ester monomers, 0.5 to 15 pbw of acid functional monomers, 0 to 10 pbw of one or more second, non-acid, polar monomers, and 0 to about 5 pbw of other vinyl monomers, based on 100 parts total monomer.

The polymerizations may be conducted in the presence of, or preferably in the absence of, suitable solvents such as ethyl acetate, toluene and tetrahydrofuran which are unreactive with the functional groups of the components of the syrup polymer.

Polymerization can be accomplished by exposing the syrup polymer composition to energy in the presence of a photoinitiator. Energy activated initiators may be unnecessary where, for example, ionizing radiation is used to initiate polymerization. These photoinitiators can be employed in concentrations ranging from about 0.0001 to about 3.0 pbw, preferably from about 0.001 to about 1.0 pbw, and more preferably from about 0.005 to about 0.5 pbw, per 100 pbw of the solvent monomer(s).

A preferred method of preparation of the syrup polymer is photoinitiated free radical polymerization. Advantages of the photopolymerization method are that 1) heating the monomer solution is unnecessary and 2) photoinitiation is stopped completely when the activating light source is turned off. Polymerization to achieve a coatable viscosity may be conducted such that the conversion of monomers to polymer is up to about 30%. Polymerization can be terminated when the desired conversion and viscosity have been achieved by removing the light source and by bubbling air (oxygen) into the solution to quench propagating free radicals. The solute polymer(s) may be prepared conventionally in a non-monomeric solvent and advanced to high conversion (degree of polymerization). When solvent (monomeric or non-monomeric) is used, the solvent may be removed (for example by vacuum distillation) either before or after formation of the syrup polymer. While an acceptable method, this procedure involving a highly converted functional polymer is not preferred because an additional solvent removal step is required, another material may be required (the non-monomeric solvent), and dissolution of the high molecular weight, highly converted solute polymer in the monomer mixture may require a significant period of time.

Useful photoinitiators include benzoin ethers such as benzoin methyl ether and benzoin isopropyl ether; substituted acetophenones such as 2,2-dimethoxyacetophenone, available as Irgacure™ 651 photoinitiator (Ciba Specialty Chemicals), 2,2 dimethoxy-2-phenyl-1-phenylethanone, available as Esacure™ KB-1 photoinitiator (Sartomer Co.; West Chester, Pa.), and dimethoxyhydroxyacetophenone; substituted α-ketols such as 2-methyl-2-hydroxy propiophenone; aromatic sulfonyl chlorides such as 2-naphthalene-sulfonyl chloride; and photoactive oximes such as 1-phenyl-1,2-propanedione-2-(O-ethoxy-carbonyl)oxime. Particularly preferred among these are the substituted acetophenones.

Preferred photoinitiators are photoactive compounds that undergo a Norrish I cleavage to generate free radicals that can initiate by addition to the acrylic double bonds. The photoinitiator can be added to the mixture to be coated after the copolymer has been formed, i.e., photoinitiator can be added to the syrup polymer mixture. Such polymerizable photoinitiators are described, for example, in U.S. Pat. Nos. 5,902,836 and 5,506,279 (Babu et al.).

The syrup polymer composition and the photoinitiator may be irradiated with activating UV radiation to polymerize the monomer component(s). UV light sources can be of two types: 1) relatively low light intensity sources such as Blacklights which provide generally 10 mW/cm$^2$ or less (as measured in accordance with procedures approved by the United States National Institute of Standards and Technology as, for example, with a UVIMAP™ UM 365 L-S radiometer manufactured by Electronic Instrumentation & Technology, Inc., in Sterling, Va.) over a wavelength range of 280 to 400 nanometers and 2) relatively high light intensity sources such as medium pressure mercury lamps which provide intensities generally greater than 10 mW/cm$^2$, preferably between 15 and 450 mW/cm$^2$. Where actinic radiation is used to fully or partially polymerize the syrup polymer composition, high intensities and short exposure times are preferred. For example, an intensity of 600 mW/cm$^2$ and an exposure time of about 1 second may be used successfully. Intensities can range from about 0.1 to about 150 mW/cm$^2$, preferably from about 0.5 to about 100 mW/cm$^2$, and more preferably from about 0.5 to about 50 mW/cm$^2$. Such photoinitiators preferably are present in an amount of from 0.1 to 1.0 pbw per 100 pbw of the syrup polymer composition.

Accordingly, relatively thick coatings (e.g., at least about 1 mil or 25.4 micrometers) can be achieved when the extinction coefficient of the photoinitiator is low.

The degree of conversion can be monitored during the irradiation by measuring the index of refraction of the polymerizing medium as previously described. Useful coating viscosities are achieved with conversions (i.e. the percentage of available monomer polymerized) in the range of up to 30%, preferably 2-20%, more preferably from 5-15%, and most preferably from 7-12%. The molecular weight (weight average) of the solute polymer(s) is at least 100,000, preferably at least 500,000.

When preparing acid functional (meth)acrylate copolymers, it is expedient for the photoinitiated polymerization reactions to proceed to virtual completion, i.e., depletion of the monomeric components, at temperatures less than about 70° C. (preferably at 50° C. or less) with reaction times less than 24 hours, preferably less than 12 hours, and more preferably less than 6 hours. These temperature ranges and reaction rates obviate the need for free radical polymerization inhibitors, which are often added to acrylic systems to stabilize against undesired, premature polymerization and gelation. Furthermore, the addition of inhibitors adds extraneous material that will remain with the system and inhibit the desired polymerization of the syrup polymer and formation of the crosslinked pressure sensitive adhesives. Free radical polymerization inhibitors are often required at processing temperatures of 70° C. and higher for reaction periods of more than about 6 to 10 hours.

In some embodiments, the acid functional (meth)acrylate copolymers may be prepared by solution methods. A typical solution polymerization method is carried out by adding the monomers, a suitable solvent, and an optional chain transfer agent to a reaction vessel, adding a free radical initiator, purging with nitrogen, and maintaining the reaction vessel at an elevated temperature, typically in the range of about 40 to 100° C. until the reaction is completed, typically in about 1 to 20 hours, depending upon the batch size and temperature. Examples of the solvent are methanol, tetrahydrofuran, ethanol, isopropanol, acetone, methyl ethyl ketone, methyl acetate, ethyl acetate, toluene, xylene, and an ethylene glycol alkyl ether. Those solvents can be used alone or as mixtures thereof.

It is preferable to coat the adhesive composition soon after preparation. The adhesive polymer composition, (containing the copolymer, monomers and crosslinking agent system), either as a syrup or solution are easily coated upon suitable substrates, such as flexible backing materials, by conventional coating techniques, then further polymerized, and cured or dried, to produce adhesive coated sheet materials. When emulsion polymerization techniques are used, an emulsion comprising the extant copolymer, and crosslinking agent system is coated and dried to produce adhesive coated sheet materials. The flexible backing material may be any material conventionally utilized as a tape backing, optical film or any other flexible material.

The pressure sensitive adhesives may also contain one or more conventional additives. Preferred additives include tackifiers, plasticizers, dyes, antioxidants, and UV stabilizers. Such additives can be used if they do not affect the superior properties of the emulsion pressure sensitive adhesives.

If tackifiers are used, then up to about 50% by weight, preferably less than 30% by weight, and more preferably less than 5% by weight based on the dry weight of the total adhesive polymer would be suitable. In some embodiments no tackifiers may be used. Suitable tackifiers for use with (meth)acrylate polymer dispersions include rosin acids, rosin esters, terpene phenolic resins, hydrocarbon resins, and cumarone indene resins. The type and amount of tackifier can affect properties such as contactability, bonding range, bond strength, heat resistance and specific adhesion.

Adhesive articles may be prepared by coating the adhesive or pre-adhesive composition of a suitable support, such as a flexible backing. Examples of materials that can be included in the flexible backing include polyolefins such as polyethylene, polypropylene (including isotactic polypropylene), polystyrene, polyester, polyvinyl alcohol, poly(ethylene terephthalate), poly(butylene terephthalate), poly(caprolactam), poly(vinylidene fluoride), polylactides, cellulose acetate, and ethyl cellulose and the like. Commercially available backing materials useful in the invention include kraft paper (available from Monadnock Paper, Inc.); cellophane (available from Flexel Corp.); spun-bond poly(ethylene) and poly(propylene), such as Tyvek™ and Typar™ (available from DuPont, Inc.); and porous films obtained from poly (ethylene) and poly(propylene), such as Teslin™ (available from PPG Industries, Inc.), and Cellguard™ (available from Hoechst-Celanese).

Backings may also be prepared of fabric such as woven fabric formed of threads of synthetic or natural materials such as cotton, nylon, rayon, glass, ceramic materials, and the like or nonwoven fabric such as air laid webs of natural or synthetic fibers or blends of these. The backing may also be formed of metal, metalized polymer films, or ceramic sheet materials may take the form of any article conventionally known to be utilized with pressure sensitive adhesive compositions such as labels, tapes, signs, covers, marking indicia, and the like.

The above-described compositions are coated on a substrate using conventional coating techniques modified as appropriate to the particular substrate. For example, these compositions can be applied to a variety of solid substrates by methods such as roller coating, flow coating, dip coating, spin coating, spray coating knife coating, and die coating. These various methods of coating allow the compositions to be placed on the substrate at variable thicknesses thus allowing a wider range of use of the compositions. Coating thicknesses may vary as previously described. The solutions may be of any desirable concentration, and degree of conversion, for subsequent coating, but is typically between 20 to 70 wt. % polymer solids, and more typically between 30 and 50 wt. % solids, in solvent. The emulsions also may be of any desirable concentration for subsequent coating, but is typically between 30 to 70 wt. % polymer solids, and generally contains less than 2% unreacted monomer. The syrup polymers may be of any desirable concentration for subsequent coating, but is typically between 5 to 20 wt. % polymer solids in monomer. The desired concentration may be achieved by further dilution of the coating composition, or by partial drying.

The flexible support may also comprise a release-coated substrate. Such substrates are typically employed when an adhesive transfer tape is provided. Examples of release-coated substrates are well known in the art and include, by way of example, silicone-coated kraft paper and the like. Tapes of the invention may also incorporate a low adhesion backing (LAB) which are known in the art.

EXAMPLES

Test Methods:

Peel Adhesion Test [ASTM D 3330/D 3330M-04]

Two 0.5 inch strips of tape were adhered to a glass plate by rolling a 4.5 lb roller onto the tape. The two tape samples were averaged. Force was measured in ounces per 0.5 inches with a platen speed of 90 and 12 inches per minute. Peel adhesion data was then normalized to Newtons per decimeter (N/dM) for the table below.

Shear Strength Test [ASTM D-3654/D 3654M 06, PSTC-7]

0.5 inch strips of tape were adhered by its adhesive to a stainless steel plate and cut down to leave 0.5 inch by 0.5 inch square for room temperature shears and a 1.0 inch by 0.5 inch square for 70° C. shears. A weight of 4.5 lbs was rolled over the adhered portion. A 1000 g load was attached to the room temperature shears and 500 g load for 70° C. shears. Each sample was suspended until failure and/or test terminated. Samples were run in triplicate and averaged for the tables below.

| Materials | |
|---|---|
| Abbreviation or Trade Designation | Description |
| IOA | Isooctyl acrylate |
| AA | Acrylic Acid |
| Irgacure 651 | 2,2-dimethoxy-2-phenylacetophenone from CIBA Corporation Tarrytown, NY |
| GMA | Glycidyl methacrylate |
| IO-Az | [structure: aziridine-N-CH2-CH(CH3)-C(=O)-O-CH2(CH2)4CH(CH3)2] |

The pre-adhesive polymer syrup was blended with various concentrations of the aziridine crosslinking agent and glycidyl methacrylate as shown in Table 1. The concentrations in Table 1 are based on the weight percent of pre-adhesive polymer syrup. The formulations were then coated on Mitsubishi Hostaphan™ primed polyester film at a 2-mil (~50 micrometers) thickness for the syrup pre-adhesive formulations and cured at 500 mJ/cm$^2$.

For comparative purposes, control examples using no crosslinking agent (Example C1), or using isooctyl aziridine (using 1.0 and 2.0 phr in Examples C2 and C3) or glycidyl methacrylate (using 0.2 phr in Example C4) as the crosslinking agents were also prepared and tested. Peel adhesion and shear strength were measured for tapes prepared from these adhesive as described in the test methods above and the data are shown in Table 1.

TABLE 1

| Example | Designation | IO-Az (phr) | GMA (phr) | Peel Adhesion on Glass (N/dM) 90 in/min | Peel Adhesion on Glass (N/dM) 12 in/min | Peel Adhesion on SS (N/dM) 90 in/min | Peel Adhesion on SS (N/dM) 12 in/min | Shear Strength on SS (min) RT | Shear Strength on SS (min) 70° C. |
|---|---|---|---|---|---|---|---|---|---|
| C1 | Control | 0 | 0 | 113 | 78 | 122 | 72 | 156 (c) | 56 (c) |
| C2 | 150292-41-1 | 1 | — | 106 | 81 | 103 | 66 | 952 (c) | 1542 (c) |
| C3 | 150292-41-4 | 2 | — | 96 | 76 | 99 | 67 | 3521 (c) | 10,000+ |
| C4 | 150292-41-3 | — | 0.2 | 106 | 85 | 97 | 63 | 158 (c) | 37 (c) |
| 1 | 150292-20-2 | 1 | 0.2 | 89 | 75 | 95 | 66 | 8622 (po) | 10,000+ |
| 2 | 150292-20-1 | 1 | 0.5 | 93 | 79 | 102 | 67 | 8307 (po) | 10,000+ |
| 3 | 150292-20-4 | 2 | 0.2 | 85 | 68 | 89 | 57 | 9522 (po) | 10,000+ |
| 4 | 150292-20-3 | 2 | 0.5 | 86 | 68 | 89 | 55 | 7231 (po) | 10,000+ |

Failure mode legend: (c) stands for cohesive, (po) stands for pop off.

Preparation of Aziridine Crosslinking Agents

The aziridine crosslinking agents may be prepared by the Michael addition of the aziridine to an acryloyl compound. Generally, 1.1 to 4 equivalents of 2-methylaziridine are mixed with an (meth)acrylate or (meth)acrylamide, followed by standing at room temperature. The excess 2-methylaziridine is removed under reduced pressure to yield the Michael adduct, which may be used without further purification. Methacrylates and acrylamides generally require heating at about 70° C. with 1.1 to 4 equivalents of 2-methylaziridine for 1 to 7 days.

Examples 1-4 and Comparative C1, C2, C3 and C4

A sixteen-ounce (~473 mL) jar was charged with 450 g of isooctyl acrylate (IOA, 90 parts), 50 g of acrylic acid (AA, 10 parts), and 0.2 g of 2,2-dimethoxy-2-phenylacetophenone photoinitiator (Irgacure 651, 0.04 phr). The monomer mixture was purged with nitrogen for 20 minutes then exposed to low intensity ultraviolet radiation until a coatable syrup copolymer was prepared, after which an additional 0.8 g (0.16 phr) of the photoinitiator was added.

As can be seen by examination of the data in Table 1, functionalization of the IOA/AA polymer with either IO-Az or GMA alone (Examples $C_1$-$C_4$) does not provide excellent shear at both room temperature and 70° C., but functionalization of the polymer with both IO-Az and GMA (Examples 1-4) provides excellent shear properties while maintaining good peel characteristics.

The invention claimed is:

1. A crosslinkable composition comprising:
   a) a first component acid-functional acrylic copolymer comprising:
      i. 85 to 99 parts by weight of an (meth)acrylic acid ester of non-tertiary alcohol;
      ii. 1 to 15 parts by weight of an acid functional monomer;
      iii. 0 to 10 parts by weight of a second, non-acid functional, polar monomer;
      iv. 0 to 5 parts vinyl monomer; and
   b) a second component epoxy-functional (meth)acryloyl monomer; and c) a third component aziridine crosslinking agent of the formula:

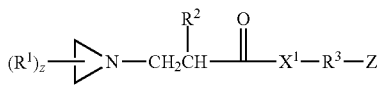

wherein
$R^1$ is H or $C_1$-$C_4$ alkyl;
z is 0, 1 or 2
$R^2$ is a H or $C_1$-$C_4$ alkyl;
$R^3$ is a (hetero)hydrocarbyl group:
$X^1$ is —O— or —$NR^1$—;
Z is —H or a water-solubilizing group.

2. The crosslinkable composition of claim 1, wherein $R^3$ is a hydrocarbyl group and $X^1$ is —O—.

3. The crosslinkable composition of claim 1, wherein Z is a water-solubilizing group.

4. The crosslinkable composition of claim 3 wherein said water-solubilizing group is a cationic, anionic, zwitterionic or nonionic water solubilizing group.

5. The crosslinkable composition of claim 3 wherein Z is $Z^1$, where $Z^1$ is an ionic water solubilizing groups selected from ammonium groups, phosphonium groups, sulfonium groups, carboxylates, sulfonates, phosphates, phosphonates or phosphinate groups.

6. The crosslinkable composition of claim 3 wherein Z is $Z^2$, where $Z^2$ is a poly(oxyalkylene) group.

7. The crosslinkable composition of claim 2 wherein Z is a hydroxyl group.

8. The crosslinkable composition of claim 1 wherein said epoxy-functional (meth)acrylate monomer is of the formula:

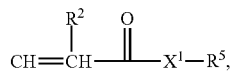

wherein
$R^2$ is a H or $C_1$-$C_4$ alkyl;
$X^1$ is —O— or —$NR^1$—; and
$R^5$ is an epoxy-containing hydrocarbyl group.

9. The crosslinkable composition of claim 1 comprising 0.005 to 5.0 parts by weight of an aziridine crosslinking agent, relative to 100 parts by weight of said first component acid-functional acrylic copolymer.

10. The crosslinkable composition of claim 1 wherein the epoxy-functional (meth)acrylate monomer is used in amounts up to a stoichiometric equivalent of said aziridine crosslinking agent.

11. The crosslinkable composition of claim 1 wherein the epoxy-functional (meth)acrylate monomer is used in amounts 0.005 to 5.0 parts by weight relative to 100 parts by weight of said first component acid-functional acrylic copolymer.

12. The crosslinkable composition of claim 1 wherein said epoxy-functional (meth)acrylate monomer is of the formula:

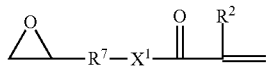

III wherein
$R^7$ is a (hetero)hydrocarbyl group;
$R^2$ is H or $C_1$-$C_4$ alkyl;
$X^1$ is —$NR^1$— or —O—, wherein $R^1$ is an H or $C_1$-$C_4$ alkyl.

13. The crosslinkable composition of claim 1 comprising 0.005 to 5.0 parts by weight of the aziridine crosslinking agent, relative to 100 parts of the copolymer.

14. The crosslinkable composition of claim 1 wherein said copolymer comprises 1 to 5 parts by weight of acrylic acid and 1 to 5 parts by weight of a polar monomer.

15. The crosslinkable composition of claim 1 wherein Z is a water-solubilizing groups and said composition is an aqueous emulsion.

16. The crosslinkable composition of claim 1 comprising an emulsion comprising:
(a) 30 to about 70 weight percent, based on the total weight of the emulsion, of the crosslinkable composition of claim 1, and
(b) 30 to 70 weight percent of an aqueous phase comprising a surfactant, based on the total weight of the emulsion.

17. The emulsion of claim 16 wherein said composition has a pH of $\geqq 4$.

18. The crosslinkable composition of claim 1 comprising a syrup polymer comprising:
a) a first component acid-functional acrylic copolymer comprising:
  i. 85 to 99 parts by weight of an (meth)acrylic acid ester of non-tertiary alcohol;
  ii. 1 to 15 parts by weight of an acid functional monomer;
  iii. 0 to 10 parts by weight of a second, non-acid functional, polar monomer;
  iv. 0 to 5 parts vinyl monomer;
b) a second component comprising at least one free-radically polymerizable solvent monomer,
c) a third component epoxy-functional (meth)acryloyl monomer; and
d) a fourth component aziridine crosslinking agent of the formula:

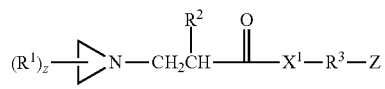

wherein
$R^1$ is H or $C_1$-$C_4$ alkyl;
z is 0, 1 or 2
$R^2$ is a H or $C_1$-$C_4$ alkyl;
$R^3$ is a (hetero)hydrocarbyl group:
$X^1$ is —O— or —$NR^1$—;
Z is —H or a water-solubilizing group.

* * * * *